Sept. 17, 1935.  J. T. NEEDHAM  2,014,448
CARRIER FOR PNEUMATIC DISPATCH TUBE APPARATUS
Original Filed Oct. 28, 1932  2 Sheets-Sheet 1
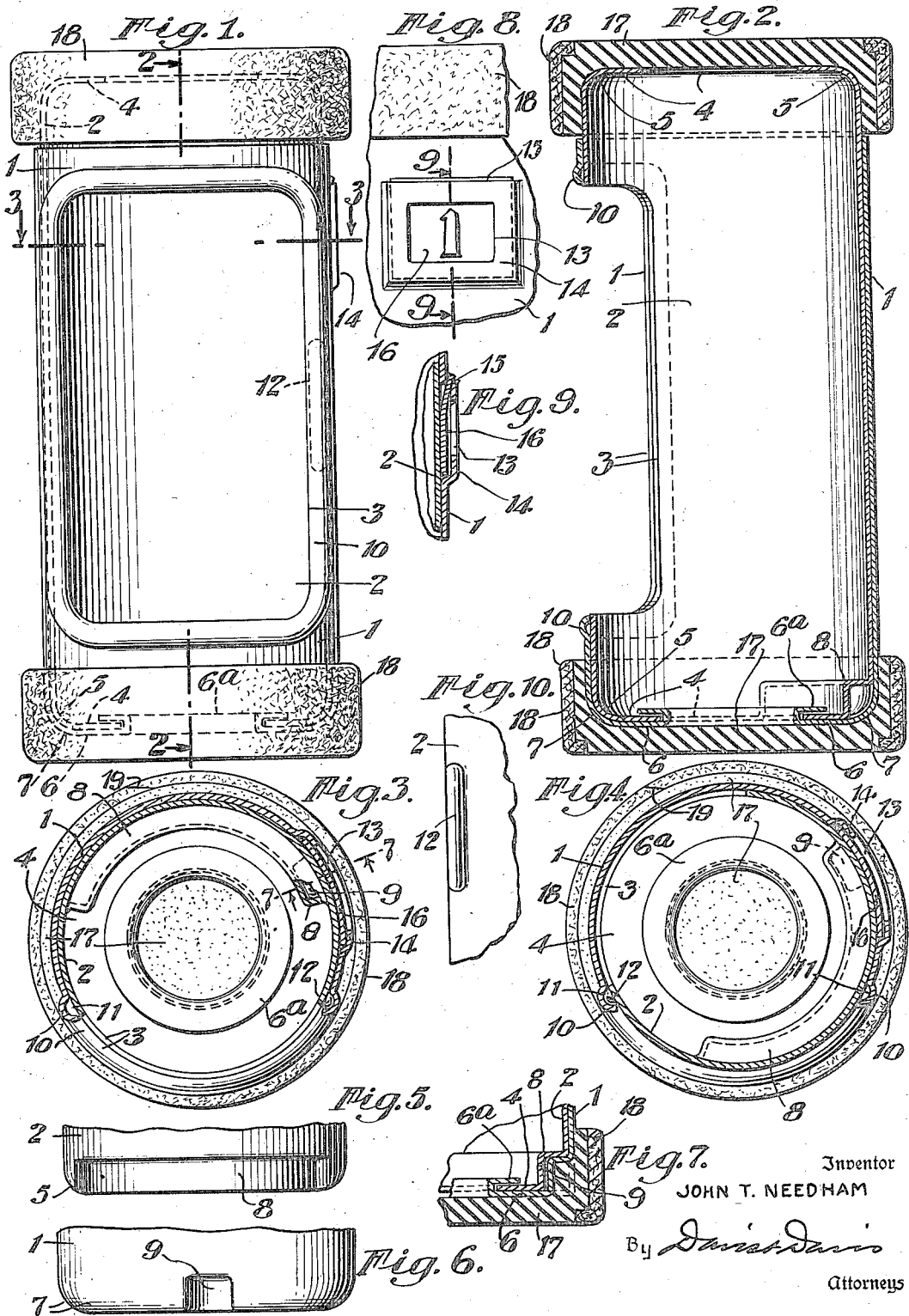
Inventor
JOHN T. NEEDHAM
By Davis Davis
Attorneys Sept. 17, 1935.  J. T. NEEDHAM  2,014,448
CARRIER FOR PNEUMATIC DISPATCH TUBE APPARATUS
Original Filed Oct. 28, 1932  2 Sheets-Sheet 2
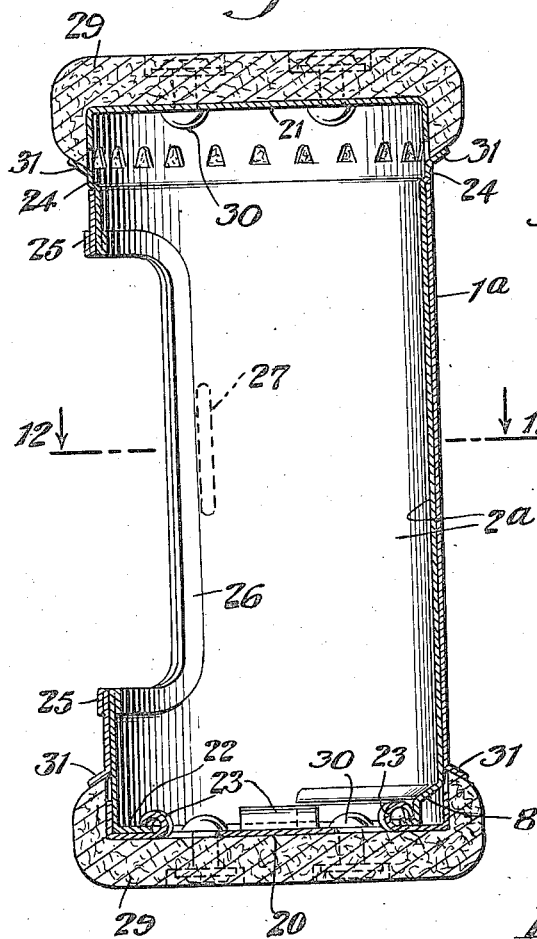
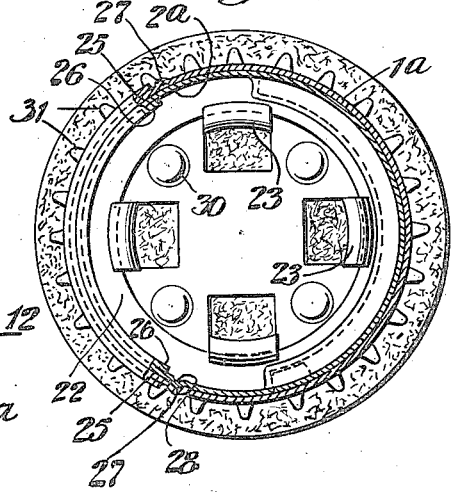
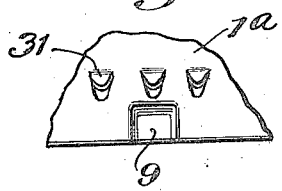
Inventor
JOHN T. NEEDHAM
By
Attorneys Patented Sept. 17, 1935

2,014,448

UNITED STATES PATENT OFFICE 2,014,448

CARRIER FOR PNEUMATIC DISPATCH TUBE APPARATUS

John T. Needham, North Plainfield, N. J.

Application October 28, 1932, Serial No. 639,982
Renewed June 19, 1935

16 Claims. (Cl. 243—34)

An important object of the present invention is to provide an improved carrier designed to facilitate its manufacture at a low cost.

Other objects of the invention will appear hereinafter.

In the drawings, Fig. 1 is a side elevation of one form of the carrier;

Fig. 2 a longitudinal section on the line 2—2 of Fig. 1;

Fig. 3 a transverse section on the line 3—3 of Fig. 1;

Fig. 4 a view similar to Fig. 3 showing the carrier closed;

Fig. 5 a side view of an end portion of the inner shell of the carrier body, showing the stop groove to limit relative rotation of the carrier shells;

Fig. 6 a side view of an end portion of the outer shell showing the integral stop lug which cooperates with said groove;

Fig. 7 a section on the line 7—7 of Fig. 3;

Fig. 8 a side view of a portion of the carrier, showing the mounting for an index slip;

Fig. 9 a section on the line 9—9 of Fig. 8;

Fig. 10 a side view of a portion of the inner shell showing the locking ridge;

Fig. 11 a longitudinal sectional view of a modified form of the carrier;

Fig. 12 a transverse section on the line 12—12 of Fig. 11; and

Fig. 13 a side view of an end portion of the outer shell of the modified carrier.

The carrier illustrated in Figs. 1 to 10 inclusive, includes a container body comprising a tubular cylindrical outer shell 1 and a similar inner shell 2 closely fitted in the outer shell. Each of said shells has a large entrance aperture 3, and the shells are relatively rotatable to bring said apertures into and out of register to open and close the carrier. Preferably the shells are made of brass or other suitable metal and they may be formed from tube stock, or from flat stock by a well known punching and drawing process. The shells bear means to hold them assembled, means to limit their relative opening and closing rotation, means to releasably hold them in open and closed positions and means to hold an index slip. All of said means are formed integrally with the shells in a simple manner, as will be described hereinafter in detail.

The inner shell 2 has at each end thereof an integral, inturned flange 4 of flat, annular form. Rounded end corner portions 5 of the shell merge said flanges with the cylindrical body of the shell. The outer shell 1 has an integral, inturned flange 6 merged with the cylindrical body of the shell by a rounded end corner portion 7. Flange 6 has a flat portion abutting one of the flat flanges 4 of the inner shell and an annular portion 6ª bent upward and outward to interlock with the abutting flange 4. Thereby a swivel connection is formed between the shells and they are held against relative endwise displacement by simple means formed integrally therewith. The adjacent rounded corner portions 5 and 7 of the two shells have the same curvature and fit together snugly. The opposite end of the outer shell is entirely open and the adjacent end of the inner shell protrudes therefrom to afford a mounting for a buffer head.

The end corner portion 5 of the inner shell, opposed to the corner portion 7 of the outer shell, is pressed inward around a portion of its circumference, as at 8, to form an arcuate groove or channel with abrupt closed ends. The corner portion 7 of the outer shell is also pressed inward at a point in its circumference to form a stop lug 9 which projects into said groove. This lug is engageable with the closed ends of the groove to limit relative rotation of the shells in either direction. The groove and stop lug are so proportioned and located on the shells as to stop the latter in open relation with the entrance apertures accurately registered and to stop the shells in closed relation with said apertures fully closed. Thus simple means integral with the shells limit their rotation.

On the outer shell 1 the margin surrounding the entrance aperture is pressed outward or crimped to form a bead 10. This bead strengthens the shell, protects its edge around the aperture and also forms part of the snap locking means formed integral with the shells to releasably hold them in open and closed relation. Said beading of the shell forms a groove 11 at the inner side of the bead. At one side of its entrance opening the inner shell 2 is pressed outward to form a locking ridge 12. This ridge is rounded transversely and is of a size to fit into the bead groove 11. When the shells are rotated forcibly to closed relation the locking ridge will snap into said groove at one side of the entrance aperture of the outer shell and when the shells are forcibly rotated to open relation the ridge will snap into the groove at the opposite side of the entrance opening. The yield and resilience of the shells permit the ridge to snap into the groove. By forcibly twisting one shell on the other the ridge is snapped out of the groove.

Near one of its ends the outer shell has a slight aperture 13 and the margin of the shell surrounding said aperture is pressed outward to form a relieved integral frame 14. At its edge nearest the adjacent end of the carrier said frame has an entrance slot 15 through which a slip 16 bearing an index or identification mark may be inserted into the frame. The frame is located in such a position that a solid portion of the inner shell will be always directly back of the frame and serve as a backing to hold the inserted slip to the frame. The entrance slit of the frame opens through the outer surface of the outer shell and enables the slip to be changed without separating the shells. The frame has a curvature corresponding to that of the outer shell and the slip is thereby flexed to frictionally hold it in the frame.

Buffer heads are mounted upon the opposite ends of the carrier body. These heads are of a composite construction disclosed in my co-pending application Serial No. 631,184, filed August 31, 1932. Each buffer head includes a moisture-impervious core comprising a flat, circular disk 17 of rather soft, resilient rubber or rubber compound. This disk is encircled by a bearing and guiding ring 18 of dense felt or felt compound of the type usually employed in the buffer heads of carriers. The felt ring forms a facing for the periphery of the rubber disk and is secured thereto. The rubber core of one buffer head is deeply recessed at one face and receives the protruding end of the inner shell 2. The rubber core of the other buffer head likewise is deeply recessed at one face and receives the flanged end of the outer shell 1. Said cores are secured to the respective shells and serve to close the ends thereof. The rim portions of the cores surrounding the recesses therein form annular flanges embracing the end margins of the shells. The containing space of the carrier body extends into the core recesses. Thereby the length of said space is increased without increasing the overall length of the carrier.

For cheapness I prefer that the felt ring 18 of each buffer head be formed from a thin, straight strip of felt which may be cut from sheet stock. The strip is curled into circular form and its ends are cemented together, as at 19. A suitable rubber compound in a condition suitable for molding and vulcanizing is placed in the felt ring and the end of the carrier shell is embedded therein. The carrier shell, the rubber compound and the bearing ring are then placed in a suitable mold and subjected to the usual vulcanizing process. The molding and vulcanizing of the rubber within the felt ring and around the end of the carrier shell intimately and permanently unites the rubber to the ring and shell and forms a durable buffer head structure which is in effect integral with the carrier shell. The rubber core is vulcanized to a sufficient degree to render the buffer head moderately compressible and resilient, but of sufficient strength and solidity to withstand the jars and shocks of service. Preferably the outer annular edge of the felt strip is curled inward and embedded in the rubber to receive impacts at the outer corner of the buffer head and protect the rubber core at this point. A composite buffer head so constructed is very much cheaper than a solid felt disk and, owing to the material reduction in the amount of felt employed, it absorbs much less moisture of condensation in a dispatch tube.

It will be seen that the carrier has been designed throughout to materially cheapen the construction of its parts and facilitate their assembly. The buffer heads may be vulcanized on the respective shells prior to assembly. Then the flanged end of the inner shell, with the stop channel 8, is inserted into the unflanged open end of the outer shell 1, and said stop channel is placed over the stop lug 9. The locations of said channel and lug enable them to be easily placed in operative relation. For assembly the portion 6a of the flange 6 is left upstanding so that it can enter the flanged end of the inserted shell 2. Then, said flange portion is upset to interlock with flange 4 and retain the shells together. This completes the assembly of the carrier. Rivets, bolts and other troublesome fastening and stop elements heretofore employed in carrier structures are entirely eliminated in the present structure. The design of the shells reinforces them and enables them to be made of quite thin metal thus further reducing the cost of construction and reducing the weight of the carrier. The recessing of the buffer heads reduces their mass and thus further reduces the carrier weight.

In the modified carrier shown in Figs. 11, 12 and 13 the outer shell 1a has a closed end 20 and is open at its opposite end. The inner shell 2a has a closed end 21 and an inturned flange 22 at its opposite end. Said flange abuts the closed end 20 of the outer shell and said end has instruck retaining tongues 23 engaging the flange at points spaced therearound to hold the shells assembled. The closed end portion of the inner shell protrudes beyond the open end of the outer shell and is enlarged as at 24 to a diameter substantially equal to that of the outer shell. The margin 25 of the outer shell surrounding the entrance aperture is turned outward and flattened against the cylindrical outer surface of the shell, while the aperture margin 26 of the inner shell is turned inward and flattened against the inner cylindrical surface, to form edge protecting and reinforcing beads. At each side of its entrance aperture the outer shell is pressed outward to form a locking groove 27. The inner shell, at one side of its entrance aperture, is pressed outward to form a locking ridge 28 for snap-locking engagement with either of the grooves 27 to hold the carrier open or closed.

On each end of the carrier body is a buffer head 29 comprising a felt disk recessed at one face to receive the closed end of one of the cylindrical shells. One of said disks is fitted over the closed end of the outer shell and the other disk is fitted over the closed end of the inner shell. As the enlarged end portion 24 of the inner shell is of the same diameter as the outer shell, disks of the same size and proportions may be employed at both ends of the carrier. Rivets 30 secure the disks to the closed ends or bottoms 20 and 21 of the shells and have their outer heads countersunk in the buffer disks. The rim portions of the disks form annular flanges fitting around the end margins of the shells and each shell is formed with a circular series of outstruck, integral clinching tongues 31 which engage the edges of said disk flanges to protect them and hold them snugly to the shells. The shells in this form of the invention also have integral means to limit their opening and closing rotation, and including the arcuate groove 8 and the locking projection 9 both formed similarly to the groove and projection of the carrier first described.

What I claim is:

1. A pneumatic dispatch carrier comprising relatively rotatable inner and outer shells forming a tubular container body and formed to open and close said body at the side thereof by relative rotation of the shells, cooperable stop means integrally formed with said shells to limit opening and closing rotation thereof, interlocking retaining means integrally formed with the shells at one end thereof and located inward clear of the peripheries of the shells and positively anchoring the shells together against relative endwise displacement, and cooperable snap locking means integrally formed with the shells to releasably lock them in closed relation.

2. A pneumatic dispatch carrier comprising relatively rotatable inner and outer shells forming a tubular container body and formed to open and close said body at the side thereof by relative rotation of the shells, means to limit opening and closing rotation of the shells, and interlocking retaining means integrally formed with the shells at one end thereof and located inward clear of the peripheries of the shells and anchoring the shells against relative endwise displacement and forming a swivel connection therebetween.

3. A pneumatic dispatch carrier comprising a pair of tubular metal shells fitted one within the other and each having an entrance opening in its side, said shells being relatively rotatable to bring said openings into and out of register to open and close the carrier, an arcuate concentric groove with closed ends formed in an end of one shell, an integral stop lug on the adjacent end of the other shell extending into said groove and engageable with the ends of the latter to limit opening and closing rotation of the shells, an integral retaining flange on an end of one of the shells, an integral retaining flange on the adjacent end of the other shell and interlocked with said first flange to hold the shells against relative endwise displacement, and cooperable snap locking means integrally formed with the shells to releasably lock the shells in closed relation.

4. A pneumatic dispatch carrier comprising a pair of tubular shells fitted one within the other and each having an entrance opening in its side, said shells being relatively rotatable to bring said openings into and out of register to open and close the carrier, an arcuate concentric groove with closed ends formed in one end of the inner shell, and an instruck integral stop lug on the adjacent end of the outer shell extending into said groove and engageable with the ends of the latter to limit opening and closing rotation of the shells.

5. A pneumatic dispatch carrier comprising a pair of tubular metal shells fitted one within the other and each having an entrance opening in its side, said shells being relatively rotatable to bring said openings into and out of register to open and close the carrier, an integral retaining flange on one end of one of the shells, and an integral retaining flange on the adjacent end of the other shell and interlocked with said first flange inward of the peripheries of the shells to hold the shells against relative endwise displacement and form a swivel connection between them.

6. A pneumatic dispatch carrier comprising a pair of tubular shells fitted one within the other and each having an entrance opening in its side, said shells being relatively rotatable to bring said openings into and out of register to open and close the carrier, the inner shell having an integral inturned flange around one end and being pressed inward at the juncture of said flange with the body of the shell to form an arcuate channel closed at its ends, and the outer shell having an inturned integral end flange interlocked with said flange on the inner shell to hold the shells against relative endwise displacement and form a swivel connection between them, and the outer shell being pressed inward at the juncture of its said end flange with the body of the shell to form an integral stop lug extending into said channel in the inner shell and engageable with the ends of the channel to limit opening and closing rotation of the shells.

7. A carrier for a pneumatic dispatch tube apparatus including a container body comprising a pair of tubular shells fitted one within the other and each having an entrance opening in its side, said shells being relatively rotatable to bring said openings into and out of register to open and close the container body, and a buffer head at each end of the container body and comprising a disk-like rubber body recessed at one face to fit around the end margin of the container body, the rubber body of one buffer head being vulcanized to the outer shell and the rubber body of the other head being vulcanized to the inner shell said recessed buffer heads enclosing and protecting the ends of the shells and serving as grips for relatively rotating the shells.

8. A pneumatic dispatch carrier comprising a pair of tubular shells fitted one within the other and each having an entrance opening in its side, said shells being relatively rotatable to bring said openings into and out of register to open and close the carrier, the outer shell being open at one end and the inner shell projecting beyond said open end, means to limit the opening and closing rotation of the shells, an integral retaining flange on an end of one of the shells, an integral retaining flange on the adjacent end of the other shell and interlocked with said first flange inward of the peripheries of the shells to hold the shells against relative endwise displacement, a buffer head recessed to receive and enclose the projecting end of the inner shell to reinforce and protect said end and secured thereto to serve as a grip for rotating said inner shell, and a buffer head recessed to receive the interlocked opposite end of the outer shell to enclose and reinforce and protect the interlocked portions of the two shells and secured thereto to serve as a grip for rotating the outer shell.

9. A pneumatic dispatch carrier comprising a pair of tubular shells fitted one within the other and each having an entrance opening in its side, said shells being relatively rotatable to bring said openings into and out of register to open and close the carrier, the outer shell being open at one end and the inner shell projecting beyond said open end, an arcuate concentric groove with closed ends formed in an end of one shell, an integral stop lug on the adjacent end of the other shell extending into said groove and engageable with the ends of the latter to limit opening and closing rotation of the shells, an integral retaining flange on an end of one of the shells, an integral retaining flange on the adjacent end of the other shell and interlocked with said first flange to hold the shells against relative endwise displacement, a buffer head recessed to receive and enclose the projecting end of the inner shell to reinforce and protect said end and secured thereto to serve as a grip for rotating said inner shell, and a buffer head recessed to receive the interlocked opposite end of the outer shell to enclose and reinforce and protect the said grooved and interlocked portions of the two shells and secured thereto to serve as a grip for rotating the outer shell.

10. A pneumatic dispatch carrier comprising a tubular outer shell open at one end and having an inturned integral abutment wall at its opposite end, a tubular inner shell inserted endwise through said open end of the outer shell and nested within the latter and having an inturned integral end abutment wall bottomed on said end abutment wall of the outer shell and defining an end aperture, and a retaining flange forming an integral portion of said abutment wall of the outer shell and inserted through said aperture and pressed radially outward over the abutment wall of the inner shell to interlock therewith and positively anchor together the shells against relative endwise displacement, each shell having an entrance opening in its side and the shells being relatively rotatable to bring said openings into and out of register, to open and close the carrier.

11. A pneumatic dispatch carrier comprising a pair of tubular shells nested one within the other and each having an entrance opening in its side, said shells being relatively rotatable to bring said openings into and out of register to open and close the carrier, one of said shells having an integral end wall defining a central end aperture in the shell and forming a flat marginal wall around said aperture and the other shell having an integral flange extending through said aperture and formed to abut both the inner and outer faces of said flat marginal wall to positively anchor said shells against relative endwise displacement.

12. A pneumatic dispatch carrier comprising a pair of tubular shells nested one within the other and each having an entrance opening in its side, said shells being relatively rotatable to bring said openings into and out of register to open and close the carrier, the outer shell being open at one end and the inner shell projecting beyond said open end, a buffer head positively secured by adhesion to and around the periphery of said projecting end of the inner shell, and a buffer head positively secured by adhesion to and around the periphery of the outer shell, whereby said buffer heads will serve as grips for relatively rotating the shells.

13. A pneumatic dispatch carrier comprising a pair of tubular shells nested one within the other and each having an entrance opening in its side, said shells being relatively rotatable to bring said openings into and out of register to open and close the carrier, the outer shell being open at one end and the inner shell projecting beyond said open end, a buffer head comprising a body of rubber positively secured to and around the periphery of said projecting end of the inner shell by vulcanization, and a buffer head positively secured to and around the periphery of the outer shell by vulcanization, whereby said buffer heads will serve as grips for relatively rotating the shells.

14. A pneumatic dispatch carrier comprising a pair of tubular shells nested one within the other and each having an entrance opening in its side, said shells being relatively rotatable to bring said openings into and out of register to open and close the carrier, the outer shell being open at one end and the inner shell projecting beyond said open end, means holding the shells against endwise relative displacement, an arcuate concentric groove with closed ends formed in an end of one shell, an integral stop lug on the adjacent end of the other shell projecting into said groove and engageable with the ends of the latter to limit opening and closing rotation of the shells, a buffer head recessed to receive and enclose the projecting end of the inner shell to reinforce and protect said end and secured thereto to serve as a grip for rotating the inner shell, and a buffer head recessed to receive, enclose and protect the opposite end of the outer shell and secured thereto to serve as a grip for rotating the outer shell.

15. A pneumatic dispatch carrier comprising a pair of tubular shells nested one within the other and each having an entrance opening in its side, said shells being relatively rotatable to bring said openings into and out of register to open and close the carrier, the inner shell being indented at one end to form an arcuate groove with closed ends and the outer shell being indented at a point on its adjacent end to form an integral stop lug projecting into said groove to engage the closed ends thereof for limiting the opening and closing rotation of the shells.

16. A pneumatic dispatch carrier comprising a pair of tubular shells nested one within the other and each having an entrance opening in its side, said shells being relatively rotatable to bring said openings into and out of register to open and close the carrier, the inner shell having an integral inturned flange at one end being indented at the juncture of said flange with the body of the shell to form an arcuate groove closed at its ends, and the outer shell having an inturned integral flange at its end adjacent said flanged end of the inner shell and being indented at the juncture of its said flange with the body of the shell to form an integral stop lug projecting into said groove to engage the closed ends thereof for limiting the opening and closing rotation of the shells.

JOHN T. NEEDHAM.